(12) United States Patent
Xu et al.

(10) Patent No.: US 8,935,641 B2
(45) Date of Patent: Jan. 13, 2015

(54) SEMICONDUCTOR CIRCUIT DESIGN METHOD, MEMORY COMPILER AND COMPUTER PROGRAM PRODUCT

(71) Applicant: Taiwan Semiconductor Manufacturing Company, Ltd., Hsinchu (TW)

(72) Inventors: Shaojie Xu, San Jose, CA (US); Yukit Tang, San Jose, CA (US); Pao-Po Hou, Saratoga, CA (US); Derek C. Tao, Fremont, CA (US); Annie-Li-Keow Lum, San Jose, CA (US)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 0 days.

(21) Appl. No.: 13/800,751

(22) Filed: Mar. 13, 2013

(65) Prior Publication Data

US 2014/0282319 A1    Sep. 18, 2014

(51) Int. Cl.
*G06F 17/50* (2006.01)

(52) U.S. Cl.
CPC .................. *G06F 17/5009* (2013.01)
USPC .............. 716/104; 716/126; 716/139

(58) Field of Classification Search
CPC .................. G06F 17/50; G06F 15/04
USPC ........................ 716/104, 126, 139
See application file for complete search history.

(56) References Cited

U.S. PATENT DOCUMENTS 7,362,135 B1 * 4/2008 Chang .......................... 326/47

* cited by examiner

*Primary Examiner* — Thuan Do
(74) *Attorney, Agent, or Firm* — Lowe Hauptman & Ham, LLP (57) ABSTRACT

A semiconductor circuit includes an array of repeating blocks, each of the blocks having a device, and at least one signal line connecting the devices of the blocks. A model of the semiconductor circuit is generated to include a functional area corresponding to at least one first block of the array, and a loading area corresponding to at least one second block of the array. In the functional area, parasitic parameters of the at least one signal line and the device of the at least one first block are extracted. In the loading area, parasitic parameters of the at least one signal line are extracted, but parasitic parameters of the device of the at least one second block are not extracted.

20 Claims, 8 Drawing Sheets

SEMICONDUCTOR CIRCUIT DESIGN METHOD, MEMORY COMPILER AND COMPUTER PROGRAM PRODUCT

BACKGROUND

The recent trend in miniaturizing integrated circuits (ICs) has resulted in smaller devices which consume less power, yet provide more functionality at higher speeds than before. The miniaturization process has also resulted in stricter design and manufacturing specifications. Pre-manufacture checking and testing are performed to make sure that a semiconductor circuit can be made and will function as designed. Parasitic parameter extraction, or RC extraction, is a common checking procedure. At advanced technology nodes where semiconductor circuit density is high, the amount of data to be processed in an RC extraction increases. As a result, it becomes more difficult to achieve the desired accuracy at an acceptable processing speed.

BRIEF DESCRIPTION I/F THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

It is to be understood that the following disclosure provides many different embodiments or examples, for implementing different features of various embodiments. Specific examples of components and arrangements are described below to simplify the present disclosure. An inventive concept may; however, be embodied in many different forms and should not be construed as being limited to the embodiments set forth herein. It will be apparent, however, that one or more embodiments may be practiced without these specific details. Like reference numerals in the drawings denote like elements.

In some embodiments, a model of a semiconductor circuit is generated. The model includes a functional area and a loading area. In an RC extraction, parasitic parameters of both devices and signal lines in the functional area are extracted. Parasitic parameters of the signal lines in the loading area are also extracted. However, parasitic parameters of devices in the loading area are not extracted. As a result, the amount of data to be handled in the RC extraction is reduced by omitting devices in the loading area, thereby improving the processing speed. At the same time, an acceptable level of accuracy is achieved by extracting the parasitic parameters of both devices and signal lines in the functional area. In some embodiments, the RC extraction accuracy is further improved for blocks that a signal line extends (or feeds) through, by specifying pins corresponding to inputs and outputs of the signal line into and from each block, and using directions of currents flowing between the pins in the RC extraction.

Figure 1:
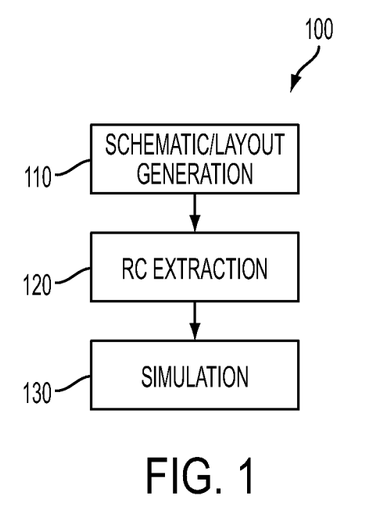
FIG. 1 is a functional flow chart of at least a portion of a semiconductor circuit design flow in accordance with some embodiments.

FIG. 1 is a functional flow chart of at least a portion of a semiconductor circuit design flow 100 in accordance with some embodiments. The design flow 100 utilizes one or more electronic design automation (EDA) tools for testing a design of a semiconductor circuit before manufacturing the same device. The EDA tools, in some embodiments, are one or more sets of executable instructions for execution by a processor or controller or a programmed computer to perform the indicated functionality. In one or more embodiments, the semiconductor circuit is a memory circuit.

At operation 110, a design of a semiconductor circuit is provided by a circuit designer. In some embodiments, the design of the semiconductor circuit includes a schematic, i.e., an electrical diagram, of the semiconductor circuit. For example, the schematic is generated or provided in the form of a schematic netlist, such as a Simulation Program with Integrated Circuit Emphasis (SPICE) netlist. In some embodiments, the design of the semiconductor circuit includes a layout, i.e., a physical arrangement of various components, of the semiconductor circuit. For example, the layout is generated in the form of a Graphic Design System (GDS) file by an EDA tool. Other data formats for describing the design are usable in some embodiments.

At operation 120, a resistance and capacitance (RC) extraction is performed. The RC extraction is run to determine parasitic parameters, e.g., parasitic resistance and parasitic capacitance, of components in the semiconductor circuit for timing or power simulations in a subsequent operation. Such parasitic parameters are not intended by the circuit designer, but nevertheless occur as a result of configurations and/or materials of various components in the semiconductor circuit. The extracted parasitic parameters are included in a netlist.

At operation 130, a simulation is performed to determine, taking the extracted parasitic parameters into account, whether the design of the semiconductor circuit meets a predetermined specification, e.g., whether the parasitic parameters cause undesirable time delays. If the design does not meet the predetermined specification, the semiconductor circuit is redesigned. Otherwise, the design is passed to subsequent operations which include, for example, manufacture or additional verification processes. In one or more embodiments, the simulation is a pre-layout simulation to determine whether the schematic meets the predetermined specification. In one or more embodiments, the simulation is a post-layout simulation to determine whether the layout meets the predetermined specification. In some embodiments, the design flow 100 further include one or more further operations, such as a layout-versus-schematic (LVS) check to ensure that the layout corresponds to the schematic, or a design rule check (DRC) to ensure that the layout satisfies certain manufacturing design rules, i.e., to ensure that the semiconductor circuit can be manufactured.

As noted herein, the accuracy and speed of the RC extraction are design considerations which, under certain circumstances, might be in conflict with each other. On the one hand, an accurate RC extraction results in an accurate timing simulation in a subsequent simulation which, in turn, permits an accurate evaluation of the design for the semiconductor circuit to be manufactured. On the other hand, an accurate RC extraction often utilizes more computing resources and is therefore slower than a less accurate RC extraction. Some embodiments therefore provide a compromise by performing an accurate RC extraction in functional areas where RC extraction accuracy is preferred, and a less accurate RC extraction in loading areas where RC extraction speed is preferred. As a result, it is possible to achieve a fast and accurate mixed RC extraction that is suitable at advanced nodes. An RC extraction methodology in accordance with some embodiments will be described in the following description with respect to a memory circuit as an example of a semiconductor circuit. However, the RC extraction methodology is applicable to other types of semiconductor circuits in further embodiments.

Figure 2A:
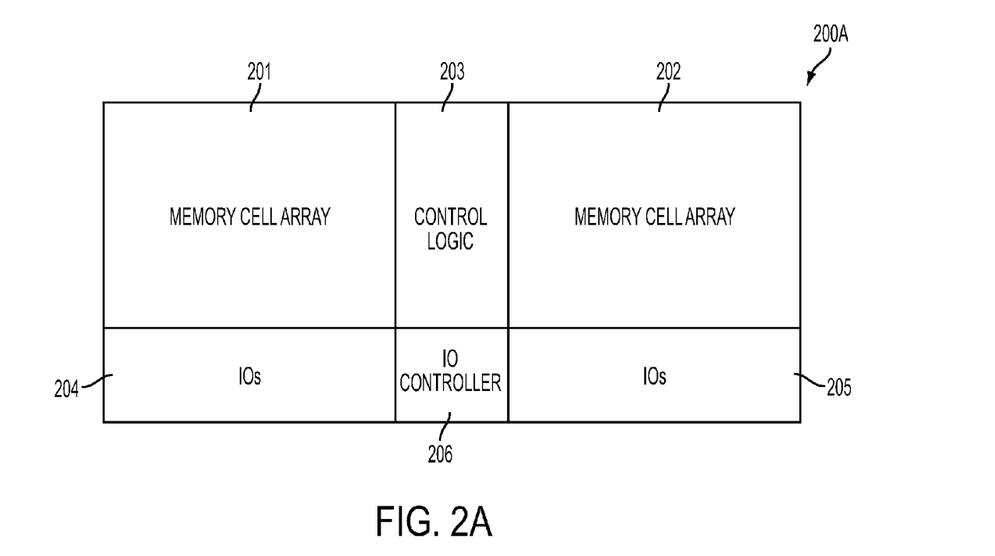
FIG. 2A is a schematic diagram of a segment of a memory circuit in accordance with some embodiments.

FIG. 2A is a schematic diagram of a segment of a memory circuit 200A in accordance with some embodiments. The memory circuit 200A includes memory cell arrays 201, 202, a control logic 203, data input/output units (IOs) 204, 205, and an IO controller 206.

Each of the memory cell arrays 201, 202 includes a plurality of memory cells arranged in a plurality of rows and columns. The memory cells in each column are coupled to at least one corresponding bit line for writing data to or reading data from the memory cells. The memory cells in each row are coupled to a corresponding word line for selecting the memory cells in a write or read operations. One or more power lines further run along the columns and/or the rows of memory cells for providing a power supply voltage and/or a reference voltage (such as the ground voltage) to the memory cells. In one or more embodiments, the memory cell arrays 201, 202 also include one or more control lines running along one or more columns and/or rows of memory cells for controlling various operations of the memory cells.

The control logic 203 includes a plurality of word line decoders/drivers coupled to the rows of memory cells in the memory cell arrays 201, 202 via the corresponding word lines. The word line decoders/drivers are configured to decode row addresses of the memory cells selected to be accessed in a read operation or a write operation. The word line decoders/drivers then enable the corresponding word lines corresponding to the decoded row addresses to permit access to the selected memory cells.

The IOs 204, 205 are coupled to the columns of memory cells in the memory cell arrays 201, 202 via the corresponding bit lines. In one or more embodiments, the IOs 204, 205 are further coupled to the power lines of the memory cell arrays 201, 202. In one or more embodiments, the IOs 204, 205 include column selectors for selecting columns with the memory cells to be accessed, based on decoded column addresses provided from column decoders which are included, for example, in the IO controller 206. In one or more embodiments, the IOs 204, 205 include sense amplifiers for reading data from the selected memory cells in a read operation, and/or write drivers for writing data to the selected memory cells in a write operation. In one or more embodiments, the IOs 204, 205 include one or more multiplexers for coupling a plurality of bit lines to each sense amplifier or write driver. Data read out from or written into the memory cells of the memory cell arrays 201, 202 is transmitted between the memory cell arrays 201, 202 and the IOs 204, 205 via the corresponding bit lines of the memory cell arrays 201, 202, and further transmitted between the IOs 204, 205 and further circuitry via input and output terminals of the IOs 204, 205.

The IO controller 206 is coupled to the control logic 203 by a plurality of control lines running along the columns of memory cells of the memory cell arrays 201, 202. The IO controller 206 is also coupled to the IOs 204, 205 by a plurality of further control lines running along the rows of memory cells of the memory cell arrays 201, 202. In one or more embodiments, the IOs 204, 205 and/or the control logic 203 are further coupled to the IO controller 206 via power lines. The IO controller 206 provides various signals along the control lines for controlling control logic 203 and the IOs 204, 205. Examples of signals provided via the control lines include, but are not limited to, address signals, clock signals, read/write enabling signals, etc.

The memory circuit 200A includes a plurality of signal lines and a plurality of devices coupled to the signal lines. Examples of signal lines include, but are not limited to, bit lines, word lines, power lines, and control lines as described herein. Examples of devices include, but are not limited to, transistors, diodes, capacitors, resistors, and circuits constituting one or more transistors, diodes, capacitors and/or resistors coupled together. Examples of such circuits include, but are not limited to, memory cells, memory cell arrays, word line decoders/drivers, sense amplifiers, write drivers, multiplexers, various control logics as described herein. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), etc.), FinFETs, and planar MOS transistors with raised source/drains. Given the large number of signal lines and devices in the memory circuit 200A, an RC extraction will take a long time and/or a large amount of computing resources if all signal lines and devices are considered in such an RC extraction. Some embodiments provide a simplified model of the memory circuit 200A for reducing the amount of data to be handled by an RC extraction, thereby increasing the processing speed without significantly sacrificing accuracy.

Figure 2B:
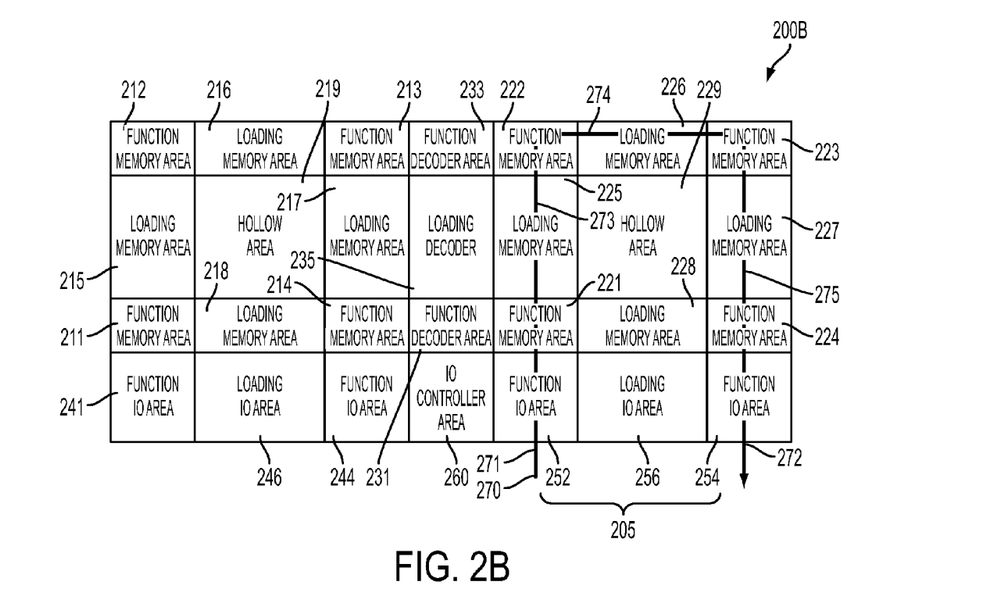
FIG. 2B is a schematic diagram of a model of a memory circuit in accordance with some embodiments.

FIG. 2B is a schematic diagram of a model 200B of the memory circuit 200A in accordance with some embodiments. In the model 200B, components of the memory circuit 200A are divided into functional areas and loading areas connected to each other by signal lines. A functional area is an area in which both devices and the signal lines are considered in an RC extraction. A loading area is an area in which the signal lines are considered, but one or some or all devices are not considered, in an RC extraction. In one or more embodiments, a loading area is disposed between and connected to two functional areas by corresponding signal lines. In one or more embodiments, the model 200B further includes one or more hollow or empty areas. A hollow area is an area in which the signal lines and devices are not considered in an RC extraction.

For example, the memory cell array 201 is divided into a plurality of functional areas including function memory areas 211-214, and a plurality of loading areas including loading memory areas 215-218. The function memory areas 211-214 are arranged at four corners of the memory cell array 201. The loading memory areas 215-218 are arranged along the sides of the memory cell array 201 and between adjacent function memory areas 211-214. The function memory areas 212, 213 and the loading memory area 216 are connected by corresponding word lines. The function memory areas 211, 214 and the loading memory area 218 are connected by corresponding word lines. The function memory areas 211, 212 and the loading memory area 215 are connected by corresponding bit lines and power lines. The function memory areas 213, 214 and the loading memory area 217 are connected by corresponding bit lines and power lines. In the embodiment specifically disclosed in FIG. 2B, the memory cell array 201 further comprises a hollow area 219 surrounded by the function memory areas 211-214 and loading memory areas 215-218. Similarly, the memory cell array 202 is divided into a plurality of functional areas including function memory areas 221-224, a plurality of loading areas including loading memory areas 225-228, and a hollow area 229. The function memory areas 221-224 and loading memory areas 225-228 are connected by corresponding word lines, bit lines and power lines similarly to the function memory areas 211-214 and loading memory areas 215-218. In one or more embodiments, the hollow area 219 and/or the hollow area 229 is/are replaced by one or more function memory areas and/or loading memory areas depending on various RC extraction considerations.

The control logic 203 is divided into a plurality of functional areas including function decoder areas 231, 233, and a loading area, i.e., a loading decoder area 235. The loading decoder area 235 is disposed between and connected to the function decoder areas 231, 233 by corresponding control lines and power lines. The function decoder area 231 is connected to the function memory areas 211, 214, 221, 224 and the loading memory areas 218, 228 by corresponding word lines. The function decoder area 233 is connected to the function memory areas 212, 213, 222, 223 and the loading memory areas 216, 226 by corresponding word lines.

The IO 204 is divided into a plurality of functional areas including function IO areas 242, 244, and a loading area, i.e., a loading IO area 246. The loading IO area 246 is disposed between and connected to the function IO areas 242, 244 by corresponding control lines and power lines. The function IO area 242 is connected to the function memory areas 211, 212 and the loading memory area 215 by corresponding bit lines and power lines. The function IO area 244 is connected to the function memory areas 213, 214 and the loading memory area 217 by corresponding bit lines and power lines. Similarly, the IO 205 is divided into a plurality of functional areas including function IO areas 252, 254, and a loading area, i.e., a loading IO area 256. The loading IO area 256 is disposed between and connected to the function IO areas 252, 254 by corresponding control lines and power lines. The function IO area 252 is connected to the function memory areas 221, 222 and the loading memory area 225 by corresponding bit lines and power lines. The function IO area 254 is connected to the function memory areas 253, 254 and the loading memory area 227 by corresponding bit lines and power lines.

The IO controller 206 is represented in the model 200B by a functional area, i.e., the IO controller area 260. The IO controller area 260 is connected to the function decoder areas 231, 233, the loading decoder area 235, the function IO areas 242, 244, 252, 254, and loading IO areas 246, 256 by corresponding control lines and power lines. In some embodiments, one of the memory cell arrays 201, 202 and the corresponding IO 204, 205 are omitted.

The numbers and/or arrangements of functional areas and loading areas in the model 200B are determined based on a critical path method in accordance with some embodiments. Other methods are within the scope of various embodiments. The critical path method selects a set of critical paths through the memory circuit for RC extraction and simulation. Critical paths are signal paths with a performance that limits the overall performance of the memory circuit. For instance, if a path is slower than other paths in the memory circuit then such a path sets a maximum speed of the memory circuit, and is referred to as a critical path. An example critical path is the longest path between a data input and a data output. The longest path often exhibits the longest time delay, and therefore, once the time delay on the longest path meets a predetermined threshold, other paths in the memory circuit are likely to meet the predetermined threshold. The focused RC extraction and simulation of the memory circuit along the critical paths reduces runtime without significantly sacrificing accuracy.

An example critical path 270 is illustrated in FIG. 2B as the longest path through the memory cell array 202 via a data input 271 and a data output 272 of the IO 205. For example, the critical path 270 begins at the data input 271 which includes the leftmost data input of the IO 205 corresponding to the leftmost column of the memory cell array 202. The critical path 270 then continues, in a section 273, along the leftmost column of the memory cell array 202 to the topmost row of the memory cell array 202. The critical path 270 then continues, in a section 274, along the topmost row of the memory cell array 202 to the rightmost column of the memory cell array 202. The critical path 270 then continues, in a section 275, along the rightmost column of the memory cell array 202, and ends at the data output 272 which includes the rightmost data output of the IO 205. Areas of the IO 205 and memory cell array 202 where the critical path 270 begins (enters), ends (exits) or changes direction are designated as functional areas. For example, the IO areas 252, 254 including the corresponding data input 271 and data output 272, where the critical path 270 begins and ends, are designed as function IO areas. The memory areas 221, 224 where the critical path 270 enters and exists the memory cell array 202 are designated as function memory areas. The memory areas 222, 223 where the critical path 270 changes direction in the memory cell array 202 are also designated as function memory areas. Other memory areas 225, 226, 227 along the critical path 270 are designated as loading memory areas.

The critical path 270 is a critical path for data access signals. Other critical paths in the memory circuit 200A are selected for various types of signals, such as clock, control, power signals, and result in various areas of the memory circuit 200A being designated as loading areas or functional areas as described herein. The width and/or height of each loading area or functional area are selectable by the circuit designer in accordance with various RC extraction or simulation considerations. For example, the width of the functional and loading areas along the section 273 and/or the section 275 of the critical path 270 is selected to include 2-4 bit lines to cover coupling effects among the bit lines, and the height of the functional and loading areas along the section 274 of the critical path 270 is selected to include 2-4 word lines to cover coupling effects among the word lines. Other widths and/or heights of functional areas and/or loading areas are within the scope of various embodiments.

Figure 3A:
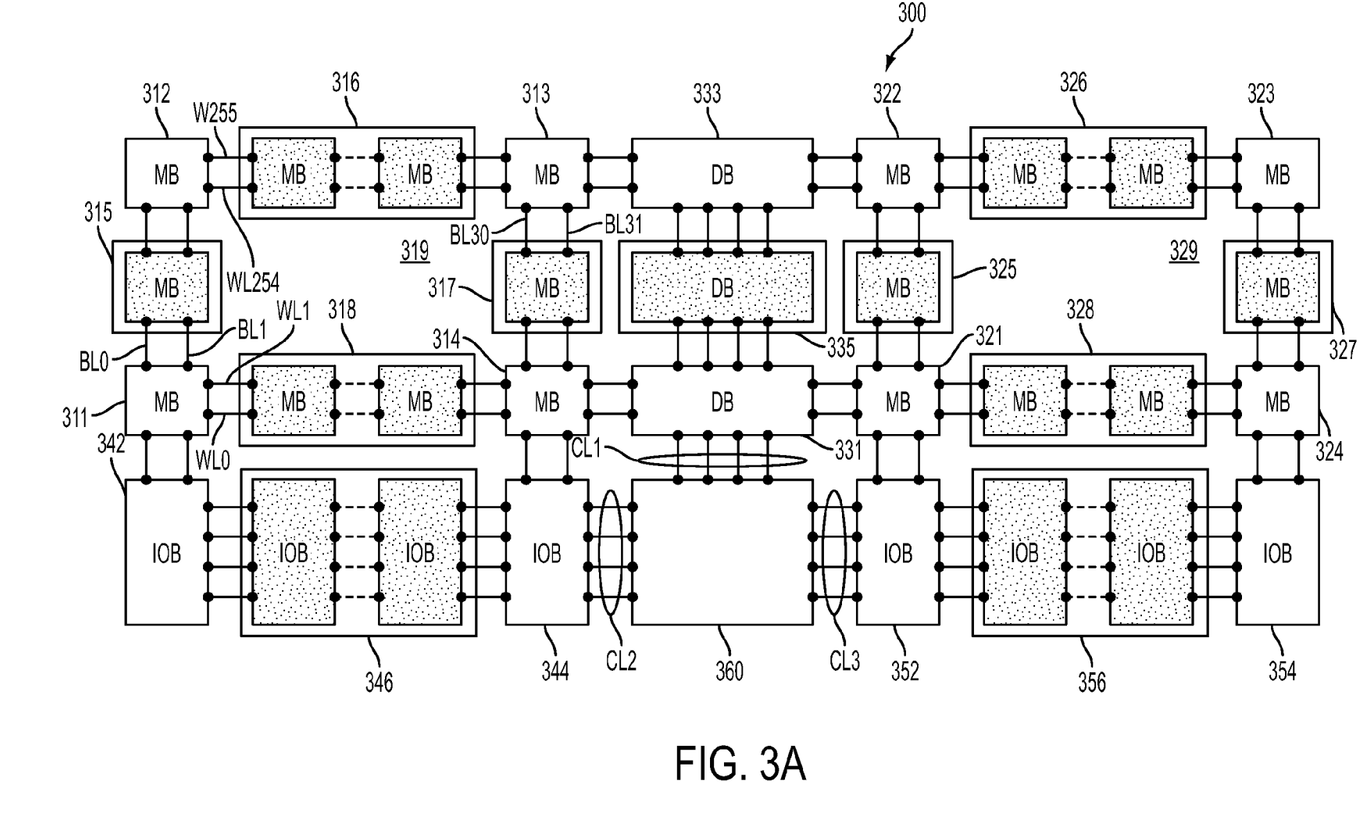
FIG. 3A is a schematic diagram of a model of a memory circuit in accordance with some embodiments.

FIG. 3A is a schematic diagram of a model 300 of the memory circuit 200A in accordance with some embodiments. Elements in FIG. 3A having corresponding elements in FIG. 2B are designated by the reference numerals of FIG. 2B increased by 100. In the model 300, each of the loading area and functional area corresponds to one or more unit blocks (also referred to herein as "blocks") of the memory circuit 200A. A unit block is repeated in the vertical direction (i.e., the direction of the columns of memory cells) and/or in the horizontal direction (i.e., the direction of the rows of memory cells) to form a one-dimensional array or a two-dimensional array of such repeating blocks. The array of repeating blocks defines a corresponding component of the memory circuit 200A. A block in a loading area is referred to as a loading block, and a block in functional area is referred to as a functional block.

Figure 3B:
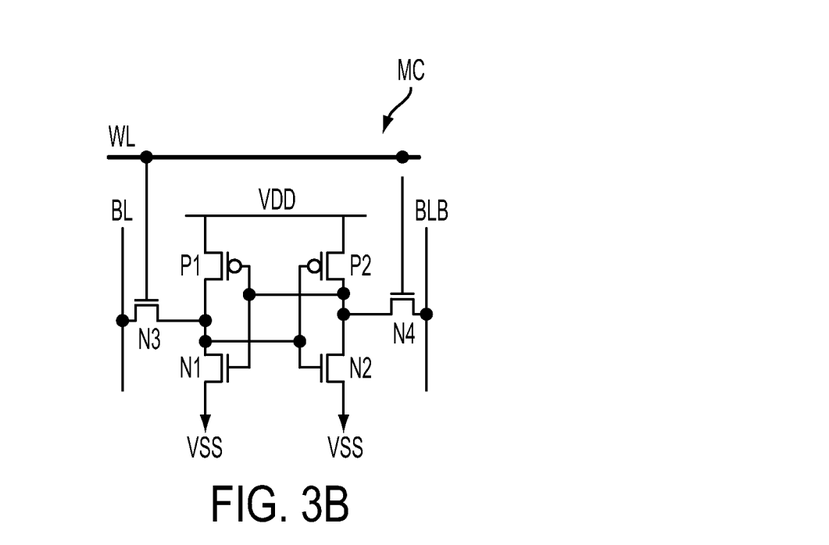
FIG. 3B is a schematic diagram of a memory cell in accordance with some embodiments.

For example, each of the memory cell arrays 201, 202 is a two-dimensional array of repeating memory blocks. Each memory block includes at least one memory cell. FIG. 3B is a schematic diagram of a memory cell MC in the memory cell arrays 201, 202. The memory cell MC includes a plurality of transistors P1, P2, N1, N2 coupled together to define a latch for storing data. The latch is connected via switches (transistors) N3, N4 to a corresponding pair of bit lines BL, BLB for reading or writing data from or to the memory cell MC. The switches N3, N4 are coupled to a word line WL to be turned ON or OFF by address signals on the word line WL. The latch of the memory cell MC is coupled to a power line VDD of a power supply voltage, and to another power line of a reference voltage (such as the ground voltage). By repeating the memory cell MC in the vertical and horizontal directions, the memory cell array 201 or 202 is obtained.

Figure 3C:
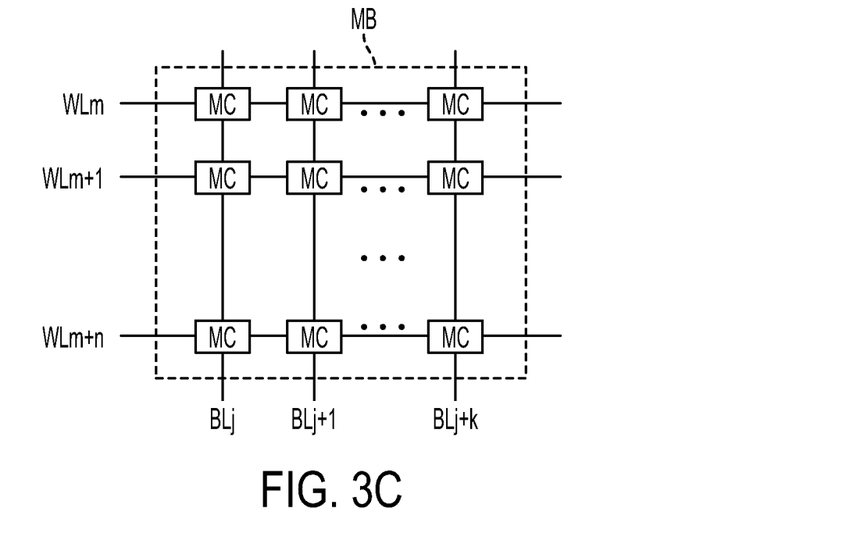
FIG. 3C is a schematic diagram of a memory block in accordance with some embodiments.

FIG. 3C is a schematic diagram of a memory block MB having a plurality of memory cells MC in accordance with some embodiments. The memory block MB includes (n+1) rows and (k+1) columns of memory cells MC. The memory cells MC in each column are coupled to the corresponding bit lines schematically illustrated and designated as BLj, BLj+1, ... BLj+k. The memory cells in each row are coupled to the corresponding word line schematically illustrated and designated as WLm, WLm+1, ... WLm+n. In one or more embodiments, one or more power lines VDD, VSS and/or one or more control lines (not shown in FIG. 3C) further run along the columns and/or the rows of memory cells MC for powering and/or controlling operation of the memory cells MC. By repeating the memory block MB in the vertical direction and/or the horizontal direction, the memory cell array 201 or 202 is obtained. In the embodiment specifically illustrated in FIG. 3A, each of the memory areas 311-318 corresponds to one or more memory blocks MB.

Similarly, as illustrated in FIG. 3A, the control logic 203 of the memory circuit 200A is a one-dimensional array of repeating decoder blocks DB, and each of the IOs 204, 205 is a one-dimensional array of repeating IO blocks IOB. Each of the decoder blocks DB includes word line decoders/drivers coupled to corresponding word lines of the corresponding memory blocks MB. For example, the decoder block DB in the function decoder area 333 includes word line decoders/drivers coupled to corresponding word lines WL254-WL255 for the corresponding memory blocks MB in the function memory areas 312, 313, 322, 323 and in the loading memory areas 316, 326. Similarly, the decoder block DB in the function decoder area 331 includes word line decoders/drivers coupled to corresponding word lines WL0-WL1 for the corresponding memory blocks MB in the function memory areas 311, 314, 321, 324 and in the loading memory areas 318, 328. The decoder blocks DB are connected to each other and to the IO controller block (or control block) 360 by a set of control lines and/or power lines CL1.

Each of the IO blocks IOB includes sense amplifiers and/or write drivers coupled to corresponding bit lines of the corresponding memory blocks MB. For example, the IO block IOB in the function IO area 342 includes sense amplifiers and/or write drivers coupled to corresponding bit lines BL0-BL1 and/or power lines (not shown in FIG. 3A) for the corresponding memory blocks MB in the function memory areas 311, 312, and in the loading memory area 315. Similarly, the IO block IOB in the function IO area 344 includes sense amplifiers and/or write drivers coupled to corresponding bit lines BL30-BL31 and/or power lines (not shown in FIG. 3A) for the corresponding memory blocks MB in the function memory areas 313, 314, and in the loading memory area 317. The IO blocks IOB in the IO areas 342, 344, 346 are connected to each other and to the control block 360 by a set of control lines and/or power lines CL2. The IO blocks IOB in the IO areas 352, 354, 356 are similarly connected to the corresponding memory block MBs, and are further connected to each other and to the control block 360 by a set of control lines and/or power lines CL3. The numbers of blocks in the each loading or functional area, as well as the numbers of bit lines, word lines or control lines connecting the corresponding blocks in FIG. 3A are examples, and change in accordance with various embodiments depending on the memory circuit configuration and/or design considerations.

As described herein, in an RC extraction, parasitic parameters of the devices and signal lines in a functional area are extracted, whereas parasitic parameters of the signal lines in a loading area are extracted, without extracting parasitic parameters of the devices in the loading area. For example, for a net including the function IO area 342, the function memory areas 311, 312 and the loading memory area 315 coupled to the bit lines BL0-BL1, parasitic parameters of the bit lines BL0-BL1 are extracted in all of the listed areas. Devices connected to the bit lines BL0-BL1 in the function IO area 342 and the function memory areas 311, 312 are also extracted. However, devices connected to the bit lines BL0-BL1 in the loading memory area 315 are not extracted. Specifically, parasitic parameters of transistors in the memory cells in the function memory areas 311, 312 are extracted, whereas parasitic parameters of transistors in the memory cells in loading memory area 315 are not extracted.

Similarly, for a net including the function memory areas 312, 313 and the loading memory area 316 coupled to the word lines WL254-WL255, parasitic parameters of the word lines WL254-WL255 are extracted in all of the listed areas. Devices connected to the word lines WL254-WL255 in the function memory areas 312, 313 are also extracted. However, devices connected to the word lines WL254-WL255 in the loading memory area 316 are not extracted. Specifically, parasitic parameters of transistors in the memory cells in the function memory areas 312, 313 are extracted, whereas parasitic parameters of transistors in the memory cells in loading memory area 316 are not extracted.

In one or more embodiments, for RC extraction purposes, devices in loading areas are considered disconnected from the corresponding signal lines. For example, referring to FIG. 3B, in an RC extraction of a memory cell MC belonging to one of the loading memory areas 315-318, the switches N3, N4 are considered disconnected form the corresponding word line WL and bit lines BL, BLB, whereas the latch defined by the transistors N1-N2, P1-P2 is considered disconnected from the corresponding power lines VDD, VSS.

In one or more embodiments, signal lines that are not feed-through lines in a loading area are not considered in an RC extraction. A feed through line is a line that extends through a particular area and further connects the area with other areas. For example, the bit lines BL0-BL1 extend through the loading memory area 315, further connects the loading memory area 315 with the function memory areas 311, 312. The bit lines BL0-BL1 are feed-through lines in the loading memory area 315 and are RC-extracted. However, word lines associated with memory cells in the loading memory area 315 are not feed-through lines because such word lines do not connect the loading memory area 315 with another area. The word lines associated with memory cells in the loading memory area 315 are not RC-extracted in accordance with some embodiments. Likewise, bit lines associated with memory cells in the loading memory area 316 are not feed-through lines, and are not RC-extracted in accordance with some embodiments.

As described herein, in accordance with some embodiments, by stripping devices and/or non-feed through signal lines from loading areas or loading blocks, the amount of data to be handled in an RC extraction is reduced, thereby improving the processing speed. An acceptable level of accuracy is achievable by RC extracting both devices the signal lines in functional areas or functional blocks. The extracted parasitic parameters from both the loading areas and the functional areas are included in a netlist for a simulation of an operation of the memory circuit. The described RC extraction methodology is applicable to both pre-layout and post layout simulations, and is also applicable to timing and power estimations.

Figure 4A:
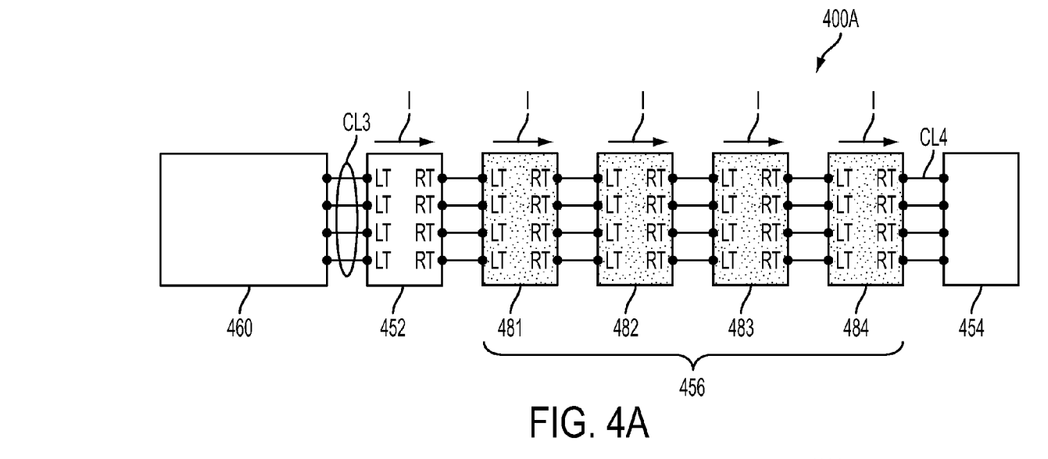
FIGS. 4A and 4B are schematic diagrams of segments of a model of a memory circuit in accordance with some embodiments.

FIG. 4A is a schematic diagram of a segment of a model 400A of the memory circuit 200A in accordance with some embodiments. Elements in FIG. 4A having corresponding elements in FIG. 3A are designated by the reference numerals of FIG. 3A increased by 100. The model 400A includes a plurality of functional blocks, including a functional IO controller block 460, functional IO blocks 452, 454, and a plurality of loading blocks, including loading IO blocks 481-484. The functional blocks and loading blocks are connected with each other by a set of control lines and/or power lines CL3. The set of control lines and/or power lines CL3 are feed-through lines for the functional IO block 452 and the loading IO blocks 481-484. For example, a top control line CL4 in the set CL3 extends through the functional IO block 452 and further connects the functional IO block 452 with other blocks, i.e., the functional IO controller block 460 and the loading IO block 481. Pins LT and RT are specified as inputs and outputs of the control line CL4 into and from the functional IO blocks 452. In addition, a direction of current I flowing along the control line CL4 between the pins LT and RT in the functional IO block 452 is also specified. Similar pins LT, RT and directions of current I are also specified for the loading IO blocks 481-484 for which the control line CL4 is a feed-through line. Similar pins LT, RT and directions of current I are further specified for the other control lines and/or power lines in the set CL3 and the functional IO block 452 and loading IO blocks 481-484.

Compared to other approaches where each net is connected to a sub-circuit at a single pins, the model 400A includes two pins for connecting each net to a sub-circuit. Specifically, two pins LT and RT are provided as connections points of a net represented by the control line CL4 to a sub-circuit represented by the functional IO block 452. As a result, the model 400A reflects more accurately the connections of a sub-circuit (i.e., the functional IO block 452) to other sub-circuits (i.e., the functional IO controller block 460 and loading IO block 481) along a net (i.e., the control line CL4), and the RC extraction accuracy for the feed-through line or net (i.e., for the control line CL4) is improved. Further, the specified direction of current I provides additional information for further increasing the RC extraction accuracy.

Figure 4B:
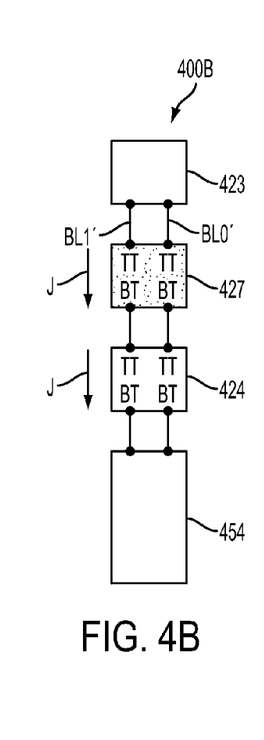

FIG. 4B is a schematic diagram of a segment of a model 400B of the memory circuit 200A in accordance with some embodiments. Elements in FIG. 4B having corresponding elements in FIG. 3A are designated by the reference numerals of FIG. 3A increased by 100. The model 400B includes functional memory blocks 423, 424, a loading memory block 427 and a functional IO block 454. The functional and loading blocks are connected with each other by bit lines BL0'-BL1' which are feed-through lines for the functional memory block 424 and the loading memory block 427. Connection pins BT and TT and directions of current J are specified for the bit lines BL0'-BL1' and the memory blocks 424 and 427 in a manner similar to the model 400A in FIG. 4A. One or more effects described with respect to the model 400A in FIG. 4A is/are also obtainable in the model 400B.

Figure 4C:
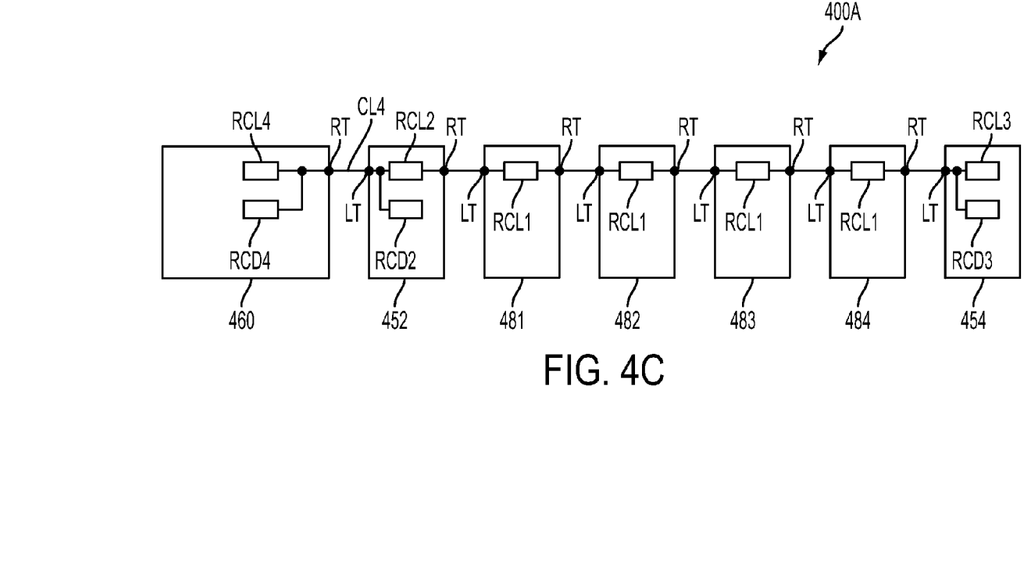
FIG. 4C is a schematic diagram for explaining the generation of a netlist after RC extraction.

FIG. 4C is a schematic diagram of the model 400A for explaining the generation of a netlist from the RC extraction of the net associated with the control line CL4 in the model 400A, in accordance with some embodiments. Specifically, the IO blocks 481-484 are loading blocks, and devices in the loading IO blocks 481-484 are not RC-extracted. Parasitic parameters of the control line CL4 in each of the loading IO blocks 481-484 are extracted and represented in FIG. 4C as an RC circuit RCL1 connected between corresponding pins LT and RT. The IO controller block 460 and the IO blocks 452, 454 are functional blocks, and both devices and signal lines are RC-extracted. Specifically, parasitic parameters of the control line CL4 in the IO blocks 452, 454 and the TO controller block 460 are extracted and represented in FIG. 4C as RC circuits RCL2, RCL3 and RCL4. Parasitic parameters of devices coupled to the control line CL4 in the IO blocks 452, 454 and the IO controller block 460 are extracted and represented in FIG. 4C as RC circuits RCD2, RCD3 and RCD4 which are coupled to the corresponding RC circuits RCL2, RCL3 and RCL4. The RC circuit RCL2 is further coupled between corresponding pins LT and RT specified for the functional IO block 452. The specified pins LT and RT are included in the netlist to identify connection points among the extracted RC circuits.

Figure 5:
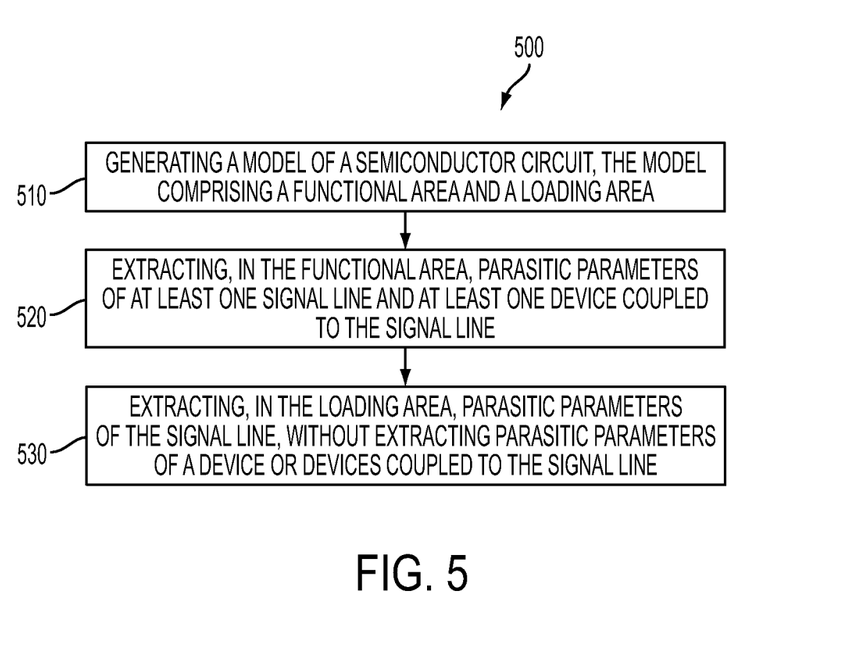
FIG. 5 is a flow chart of a semiconductor circuit design method in accordance with some embodiments.

FIG. 5 is a flow chart of a semiconductor circuit design method 500 in accordance with some embodiments. The method 500 is performed by one or more processors of one or more computer systems as described with respect to FIG. 7. The one or more processors are hardwired and/or programmed to define one or more tools described with respect to FIG. 1 and to perform one or more operations and/or functionality described with respect to FIGS. 2A-4C. In one or more embodiments where the semiconductor circuit is a memory circuit, the method 500 is used as an algorithm of a memory compiler for designing the memory circuit.

At operation 510, a model of a semiconductor circuit is generated. The model comprises a functional area and a loading area. For example, a model 200B of a semiconductor circuit, which is a memory circuit in one or more embodiments, is generated as described with respect to FIGS. 2A-2B. The generated model 200B includes at least one functional area, such as functional areas 211-214, 221-224, 231, 233, 242, 244, 252, 254 and 260. The generated model 200B further includes at least one loading area, such as loading areas 215-218, 225-228, 232, 246 and 256, as described with respect to FIG. 2B. In one or more embodiments, each functional area or loading area corresponds to one or more of repeating blocks of the semiconductor circuit. For example, the function memory area 312 and the loading memory area 315 each include one or more repeating memory blocks MB of the memory cell arrays 201, 202, as described with respect to FIG. 3A.

At operation 520, in the functional area, parasitic parameters of at least one signal line and at least one device coupled to the signal line are extracted. For example, both devices and signal lines in the functional areas or functional blocks are extracted as described with respect to FIGS. 2B-3A.

At operation 530, in the loading area, parasitic parameters of the signal line are extracted, without extracting parasitic parameters of a device or devices coupled to the signal line. For example, parasitic parameters of signal lines in the loading areas or loading blocks are extracted, whereas parasitic parameters of devices coupled to the signal lines are not extracted, as described with respect to FIGS. 2B-3A. In one or more embodiments, the method 500 further includes generating a netlist including the extracted parasitic parameters and using the netlist in a simulation of an operation of the semiconductor circuit, as described with respect to FIG. 1.

Figure 6:
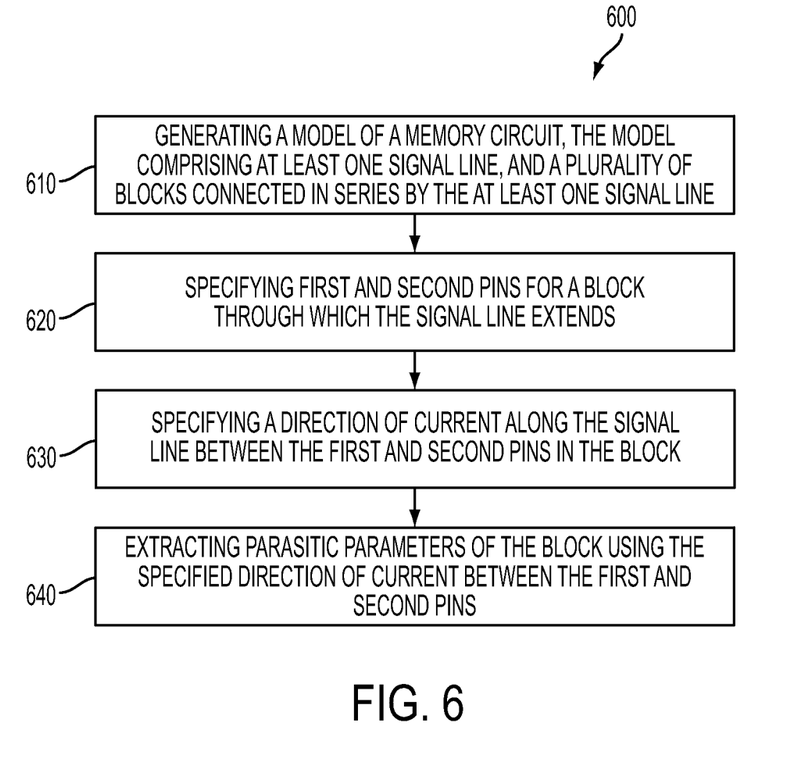
FIG. 6 is an algorithm of a memory compiler in accordance with some embodiments.

FIG. 6 is an algorithm 600 of a memory compiler in accordance with some embodiments.

At operation 610, a model of a memory circuit is generated to comprises at least one signal line, and a plurality of blocks connected in series by the at least one signal line. For example, a model 300, 400A or 400B of a memory circuit is generated as described with respect to FIGS. 3A, 4A and 4B. The generated model includes at least one signal line, such as the control line CL4, and a plurality of blocks 460, 452, 481-484, and 454 connected in series by the control line CL4, as described with respect to FIG. 4A. In one or more embodiments, the at least one signal line is selected from the group consisting of at least one word line, at least one bit line, at least one control line, and at least one power line, and each of the blocks is selected from the group consisting of a memory block, a decoder block, an input-output (IO) block, and a control block, as described with respect to FIG. 3A.

At operation 620, first and second pins for a block through which the signal line extends are specified. For example, pins LT, RT are specified for the functional IO block 452 through which the control line CL4 extends, as described with respect to FIG. 4A. The pins LT, RT correspond to connections points of the functional IO block 452 to other blocks functional IO controller block 460 and loading IO block 481 via the control line CL4.

At operation 630, a direction of current along the signal line between the first and second pins in the block is specified. For example, a direction of current I along the control line CL4 between the pins LT and RT in the functional IO block 452 is specified, as described with respect to FIG. 4A.

At operation 640, parasitic parameters of the block are extracted using the specified direction of current between the first and second pins. For example, parasitic parameters of the functional IO block 452 are extracted using the specified direction of current I between the pins LT and RT, as described with respect to FIG. 4A. The extracted parasitic parameters and pins RT, LT of the functional IO block 452 as well as the extracted parasitic parameters of the other blocks are included in a netlist, as described with respect to FIG. 4C.

Figure 7:
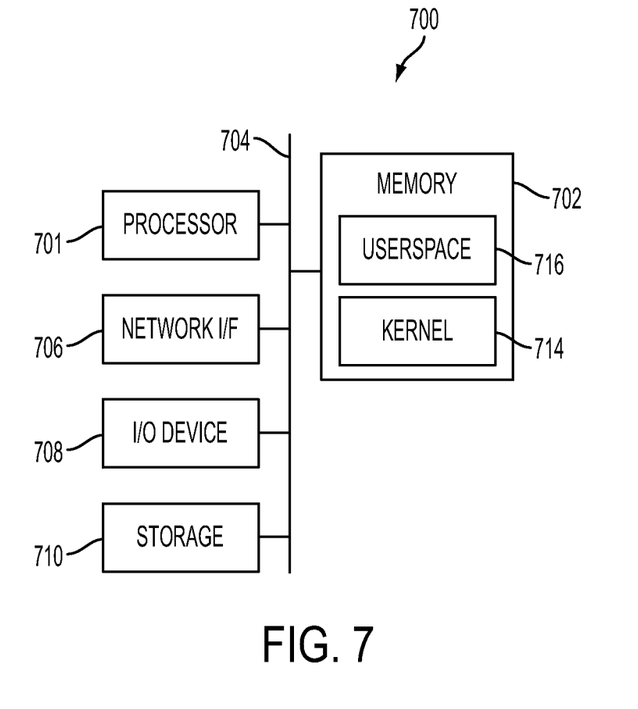
FIG. 7 is a block diagram of a computer system in accordance with some embodiments.

FIG. 7 is a block diagram of a computer system 700 in accordance with some embodiments. The memory compiler described with respect to FIG. 6 is realized in some embodiments by one or more computer systems 700 of FIG. 7. The system 700 comprises at least one processor 701, a memory 702, a network interface (I/F) 706, a storage 710, an input/output (I/O) device 708 communicatively coupled via a bus 704 or other interconnection communication mechanism.

The memory 702 comprises, in some embodiments, a random access memory (RAM) and/or other dynamic storage device and/or read only memory (ROM) and/or other static storage device, coupled to the bus 704 for storing data and/or instructions to be executed by the processor 701, e.g., kernel 714, user space 716, portions of the kernel and/or the user space, and components thereof. The memory 702 is also used, in some embodiments, for storing temporary variables or other intermediate information during execution of instructions to be executed by the processor 701.

In some embodiments, a storage device 710, such as a magnetic disk or optical disk, is coupled to the bus 704 for storing data and/or instructions, e.g., kernel 714, user space 716, etc. The I/O device 708 comprises an input device, an output device and/or a combined input/output device for enabling user interaction with the system 700. An input device comprises, for example, a keyboard, keypad, mouse, trackball, track pad, and/or cursor direction keys for communicating information and commands to the processor 701. An output device comprises, for example, a display, a printer, a voice synthesizer, etc. for communicating information to a user.

In some embodiments, one or more operations and/or functionality of the memory compiler described with respect to FIG. 6 are realized by the processor 701, which is programmed for performing such operations and/or functionality. One or more of the memory 702, the I/F 706, the storage 710, the I/O device 708, and the bus 704 is/are operable to receive instructions, data, design rules, netlists, layouts, models and/or other parameters for processing by the processor 701.

In some embodiments, one or more of the operations and/or functionality described with respect to FIGS. 5-6 is/are implemented by specifically configured hardware (e.g., by one or more application specific integrated circuits (ASICs) which is/are included) separate from or in lieu of the processor 701. Some embodiments incorporate more than one of the described operations and/or functionality in a single ASIC.

The above methods include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

According to some embodiments, in a method performed by at least one processor for designing a semiconductor circuit, a model of the semiconductor circuit is generated. The semiconductor circuit comprises an array of repeating blocks, each of the blocks comprising a device, and at least one signal line connecting the devices of the blocks. The model comprises a functional area corresponding to at least one first block among the blocks of the array, and a loading area corresponding to at least one second block among the blocks of the array. In the functional area, parasitic parameters of the at least one signal line and the device of the at least one first block are extracted. In the loading area, parasitic parameters of the at least one signal line are extracted, without extracting parasitic parameters of the device of the at least one second block.

According to some embodiments, a memory compiler comprises a processor configured to generate a model of a memory circuit. The model comprises at least one signal line selected from the group consisting of at least one word line, at least one bit line, at least one control line, and at least one power line. The model further comprises a plurality of blocks connected in series by the at least one signal line. The at least one signal line extends through at least one of the blocks. Each of the blocks is selected from the group consisting of a memory block, a decoder block, an input-output (IO) block, and a control block. The processor is further configured to specify first and second pins for the at least one block through which the at least one signal line extends. The first and second pins correspond to connections points of the at least one block to other blocks via the at least one signal line. The processor is further configured to specify a direction of current along the at least one signal line between the first and second pins in the at least one block. The processor is further configured to extract parasitic parameters of the plurality of blocks, wherein the parasitic parameters of the at least one block are extracted using the specified direction of current between the first and second pins.

According to some embodiments, a computer program product comprises a non-transitory, computer-readable medium containing therein instructions which, when executed by at least one processor, cause the at least one processor to perform one or more operations. In the one or more operations, a model of a semiconductor circuit is generated. The model comprises at least one signal line, and a plurality of repeating blocks connected in series by the at least one signal line. Each of the blocks comprises a device connected to the at least one signal line. The blocks comprise loading blocks arranged between functional blocks. The at least one signal line extends through the loading blocks to connect the functional blocks. For each of the loading blocks, first and second pins corresponding to connections points of the loading block to other blocks via the at least one signal line are specified. For each of the loading blocks, a direction of current along the at least one signal line between the corresponding first and second pins is specified. In each of the functional blocks, parasitic parameters of the corresponding device and the at least one signal line are extracted. In each of the loading blocks, parasitic parameters of the at least one signal line are extracted, without extracting parasitic parameters of the corresponding device, wherein the parasitic parameters of the at least one signal line are extracted using the specified direction of current between the corresponding first and second pins.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of designing a semiconductor circuit, the semiconductor circuit comprising
   an array of repeating blocks, each of the blocks comprising a device, and
   at least one signal line connecting the devices of the blocks, said method performed by at least one processor and comprising: generating a model of the semiconductor circuit, the model comprising
   a functional area corresponding to at least one first block among the blocks of the array, and
   a loading area corresponding to at least one second block among the blocks of the array;
   extracting, in the functional area, parasitic parameters of the at least one signal line and the device of the at least one first block; and
   extracting, in the loading area, parasitic parameters of the at least one signal line, without extracting parasitic parameters of the device of the at least one second block.

2. The method of claim 1, further comprising:
   generating a netlist of the semiconductor circuit, the netlist comprising the parasitic parameters extracted from the functional area and the loading area.

3. The method of claim 1, wherein the at least one signal line extends through the at least one second block.

4. The method of claim 3, further comprising:
   specifying first and second pins for the at least one second block, the first and second pins corresponding to connections points of the at least one second block to other blocks via the at least one signal line, and
   specifying a direction of current along the at least one signal line between the first and second pins in the at least one second block,
   wherein said extracting the parasitic parameters of the at least one signal line in the loading area comprises using the specified direction of current between the first and second pins in the at least one second block.

5. The method of claim 4, further comprising:
   generating a netlist of the semiconductor circuit, the netlist comprising the parasitic parameters extracted from the functional area and the loading area and the first and second pins.

6. The method of claim 4, wherein the at least one signal line further extends through the at least one first block.

7. The method of claim 6, further comprising:
   specifying third and fourth pins for the at least one first block, the third and fourth pins corresponding to connections points of the at least one first block to other blocks via the at least one signal line, and
   specifying a direction of current along the at least one signal line between the third and fourth pins in the at least one first block,
   wherein said extracting the parasitic parameters in the functional area comprises using the specified direction of current between the third and fourth pins in the at least one first block.

8. The method of claim 1, wherein
   the at least one first block comprises multiple first blocks,
   the at least one second block is positioned between the first blocks, and
   the at least one signal line extends through the at least one second block to connect the first blocks.

9. The method of claim 8, wherein
   the array comprises a one-dimensional array, and
   the first blocks are arranged at opposite ends of the one-dimensional array.

10. The method of claim 9, wherein
    the semiconductor circuit comprises a memory circuit,
    the blocks in the one-dimensional array comprise at least one selected from the group consisting of input-output (IO) blocks and decoder blocks, and
    the at least one signal line comprises at least one selected from the group consisting of at least one power line and at least one control line.

11. The method of claim 8, wherein
    the array comprises a two-dimensional array,
    the first blocks are arranged at corners of the two-dimensional array, and
    the at least one second block comprises multiple second blocks arranged along fours sides of the two-dimensional array and between the first blocks.

12. The method of claim 11, wherein the model further comprises an empty area surrounded by the first and second blocks arranged at the corners and along the four sides of the array.

13. The method of claim 11, wherein
    the semiconductor circuit comprises a memory circuit,
    the blocks in the two-dimensional array comprises memory blocks, and
    the at least one signal line comprises at least one selected from the group consisting of at least one word line, at least one bit line, and at least one power line.

14. The method of claim 1, further comprising:
performing a simulation of an operation of the semiconductor circuit, wherein the simulation comprises using the extracted parasitic parameters.

15. A memory compiler, comprising a processor configured to:
generate a model of a memory circuit, the model comprising
at least one signal line selected from the group consisting of at least one word line, at least one bit line, at least one control line, and at least one power line, and
a plurality of blocks connected in series by the at least one signal line, the at least one signal line extending through at least one of the blocks of the plurality of blocks, each of the blocks of the plurality of blocks selected from the group consisting of a memory block, a decoder block, an input-output (IO) block, and a control block;
specify first and second pins for the at least one block through which the at least one signal line extends, the first and second pins corresponding to connections points of the at least one block to other blocks via the at least one signal line;
specify a direction of current along the at least one signal line between the first and second pins in the at least one block; and
extract parasitic parameters of the plurality of blocks, wherein the processor is configured to extract the parasitic parameters of the at least one block using the specified direction of current between the first and second pins.

16. The memory compiler of claim 15, wherein the processor is further configured to generate a netlist of the memory circuit, the netlist comprising the extracted parasitic parameters of the blocks of the plurality of blocks.

17. The memory compiler of claim 15, wherein
each of the blocks of the plurality of blocks comprises a device connected to the at least one signal line, and
the blocks of the plurality of blocks comprise
at least one functional block in which the processor is configured to extract the parasitic parameters of the corresponding device and the at least one signal line, and
at least one loading block in which the processor is configured to extract the parasitic parameters of the at least one signal line, without extracting parasitic parameters of the corresponding device.

18. The memory compiler of claim 17, wherein the model of the memory circuit comprises
a two-dimensional array of repeating memory blocks arranged in a plurality of rows and columns, wherein the memory blocks in each of the rows are connected by word lines, and the memory blocks in each of the columns are connected by bit lines,
a column of repeating decoder blocks, each of the decoder blocks connected to one of the rows of memory blocks by the corresponding word lines, wherein the decoder blocks are connected by control lines,
a row of repeating IO blocks, each of the IO blocks connected to one of the columns of memory blocks by the corresponding bit lines, wherein the IO blocks are connected by further control lines, and
a control block connected to the column of decoder blocks and the row of IO blocks by the corresponding control lines.

19. The memory compiler of claim 17, wherein
the two-dimensional array of memory blocks comprises:
functional memory blocks at four corners of the two-dimensional array, and
loading memory blocks arranged along fours sides of the two-dimensional array between the functional memory blocks,
the column of decoder blocks comprises:
functional decoder blocks corresponding to uppermost and lowermost rows in the two-dimensional array of memory blocks, and
loading decoder blocks corresponding to the remaining rows in the two-dimensional array of memory blocks, and
the row of IO blocks comprises:
functional IO blocks corresponding to leftmost and rightmost columns in the two-dimensional array of memory blocks, and
loading IO blocks corresponding to the remaining columns in the two-dimensional array of memory blocks.

20. A computer program product, comprising a non-transitory, computer-readable medium containing instructions therein which, when executed by at least one processor, cause the at least one processor to
generate a model of a semiconductor circuit, the model comprising
at least one signal line, and
a plurality of repeating blocks connected in series by the at least one signal line, wherein
each of the blocks of the plurality of repeating blocks comprises a device connected to the at least one signal line,
the blocks of the plurality of repeating blocks comprise loading blocks arranged between functional blocks, and
the at least one signal line extends through the loading blocks to connect the functional blocks;
specify, for each of the loading blocks, first and second pins corresponding to connections points of the loading block to other blocks of the plurality of repeating blocks via the at least one signal line;
specify, for each of the loading blocks, a direction of current along the at least one signal line between the corresponding first and second pins;
extract, in each of the functional blocks, parasitic parameters of the corresponding device and the at least one signal line; and
extract, in each of the loading blocks, parasitic parameters of the at least one signal line, without extracting parasitic parameters of the corresponding device, wherein the parasitic parameters of the at least one signal line are extracted using the specified direction of current between the corresponding first and second pins.

* * * * *